United States Patent
Ito et al.

(10) Patent No.: US 8,386,837 B2
(45) Date of Patent: Feb. 26, 2013

(54) STORAGE CONTROL DEVICE, STORAGE CONTROL METHOD AND STORAGE CONTROL PROGRAM

(75) Inventors: Mikio Ito, Kawasaki (JP); Hidejirou Daikokuya, Kawasaki (JP); Kazuhiko Ikeuchi, Kawasaki (JP); Chikashi Maeda, Kawasaki (JP)

(73) Assignee: Fujistu Limited, Kawasaki (JP)

( * ) Notice: Subject to any disclaimer, the term of this patent is extended or adjusted under 35 U.S.C. 154(b) by 241 days.

(21) Appl. No.: 12/261,853

(22) Filed: Oct. 30, 2008

(65) Prior Publication Data

US 2009/0113237 A1 Apr. 30, 2009

(30) Foreign Application Priority Data

Oct. 31, 2007 (JP) ................. 2007-284546

(51) Int. Cl.
*G06F 11/00* (2006.01)
(52) U.S. Cl. ..................... 714/6.2; 714/6.22
(58) Field of Classification Search .............. 714/6, 7, 714/6.2, 6.22
See application file for complete search history.

(56) References Cited

U.S. PATENT DOCUMENTS

| | | | |
|---|---|---|---|
| 5,253,256 A | 10/1993 | Oyama et al. | |
| 5,495,572 A | 2/1996 | Tanaka et al. | |
| 6,430,701 B1 * | 8/2002 | Takazawa | 714/6 |
| 6,516,425 B1 | 2/2003 | Belhadj et al. | |
| 7,185,222 B2 * | 2/2007 | Burton et al. | 714/5 |
| 7,543,178 B2 * | 6/2009 | McNeill et al. | 714/6 |
| 7,698,592 B2 * | 4/2010 | Cashman | 714/6 |
| 2006/0212748 A1 * | 9/2006 | Mochizuki et al. | 714/6 |
| 2010/0251012 A1 * | 9/2010 | Zwisler et al. | 714/7 |

FOREIGN PATENT DOCUMENTS

| | | |
|---|---|---|
| EP | 0 632 376 | 1/1995 |
| JP | 03-240123 | 10/1991 |
| JP | 5-314674 | 11/1993 |
| JP | 07-028710 | 1/1995 |
| JP | 7-261945 | 10/1995 |
| JP | 2001-147785 | 5/2001 |
| JP | 2006-259894 | 9/2006 |

OTHER PUBLICATIONS

Japanese Office Action dated Oct. 20, 2009 and issued in corresponding Japanese Patent Application 2007-294546.

* cited by examiner

*Primary Examiner* — Philip Guyton
(74) *Attorney, Agent, or Firm* — Staas & Halsey LLP

(57) ABSTRACT

A storage control device includes a first rebuilding unit rebuilding information stored in one of a plurality of storages that fails by using information stored in the plurality of storages excluding said failed storage and storing rebuilt information in a spare storage replaced with the failed storage, a second rebuilding unit rebuilding information stored in two of said plurality of storages that fail by using information stored in said plurality of storages excluding the two failed storages and storing rebuilt information in two spare storages replaced with the two failed storages, and a rebuilding control unit for controlling said first rebuilding unit and second rebuilding unit where one of said spare storages fails during rebuilding the data stored in said two failed storages to replace the failed spare storage with other spare storage whereby said second rebuilding unit continues rebuilding the data.

12 Claims, 13 Drawing Sheets

FIG. 3

| 0x00 | reserve | | Status | |
|---|---|---|---|---|
| 0x04 | PLUN | | reserve | |
| 0x08 | RLUN | | reserve | |
| 0x0C | reserve | | | |
| ~ | ~ | | | |
| 0x14 | reserve | | | |
| 0x18 | reserve | | | |
| 0x1C | Block Count | | | |
| 0x20 | rebuild_plba(REBUILDING PROGRESS) | | | |
| 0x24 | reserve | | | |
| 0x28 | Rebuild Block Count | | | |
| 0x2C | reserve | | | |
| ~ | ~ | | | |
| 0x5C | reserve | | | |
| 0x60 | rebuild_pair_plun | reserve | rebuild_mode | |
| 0x64 | rebuild_follow_end_plba | | | |
| 0x68 | rebuild_plural_plba | | | |
| 0x6C | reserve | | | |
| ~ | ~ | | | |
| 0x7C | reserve | | | |

0x60–0x68: DUAL REBUILDING PARAMETERS

FIG. 4

| 0x00 | RLUN | | DESTINATION PLUN | |
|---|---|---|---|---|
| | reserve | | SOURCE PLUN | |
| 0x04 | previous_acb_address | | | |
| 0x08 | next_acb_address | | | |
| 0x0C | rebuild_start_lba | | | |
| 0x10 | plural_rebuild_exe | reserve | awaken_need | rebuild_sleep |
| 0x14 ~ 0x7C | reserve | | | |

STORAGE CONTROL DEVICE, STORAGE CONTROL METHOD AND STORAGE CONTROL PROGRAM

CROSS-REFERENCE TO RELATED APPLICATIONS

This application is related to and claims priority to Japanese patent application no. 2007-284546 filed on Oct. 31, 2007 in the Japan Patent Office, the entire contents of which are incorporated by reference herein.

BACKGROUND

1. Field

The present invention relates to a redundancy technique for storing information, such as data and parities, to be stored across a plurality of storage.

2. Description of the Related Art

With storages getting larger, amounts of data stored in the storages have been increasing. For storages connected with severs, Redundant Arrays of Inexpensive Disks (RAID) technique is employed to protect important data.

RAID enables a bunch of storages such as hard disk drives to be treated as a single storage. There are seven RAID levels from RAID 0 to RAID 6 depending upon their properties such as performance speed and reliability. In situations having fault tolerance from two storage failures, RAID 6 has begun to receive attention recent years. In RAID 6, two sorts of parity are generated from data to be stored. The data and the parities are striped and stored across a plurality of storages.

Storage systems generally include storages of the same model that are manufactured at the same periods. Consequently, the storages included in the systems may fail at the same mean time between failures (MTBF). Therefore, if one of the storages fails, a sequential storage failure may occur within a short period of time. During rebuilding the storages in RAID, storages are vulnerable because of overheads associated therewith due to streams of data reading. Since the concurrent-failure-tolerance of RAID 6 vastly increases data protection over RAID 5, RAID 6 has been receiving increased attention. Data and parities stored in failed storages in a RAID group are rebuilt and stored by replacing the failed storages with spares storages called hot spare (HS) and by using data and parities stored in the rest of the storages. Hereinafter, the data and the parities stored in the storages are collectively referred to as information.

Conventional storage control device capable of rebuilding storages in RAID 6 has been disclosed in Japanese Laid-open patent publication No. 2006-259894. Where other storage fails during rebuilding data stored in a failed storage, data stored in the two failed storages are rebuilt coordinately depending on a rebuilding progress of the data having been rebuilt before the second failure occurs. Since the storage control device rebuilds only stripes not having been rebuilt after the second failure occurs, the redundant data are effectively rebuilt.

In addition to the two storage failures, one of hot spares that are replaced with the failed storages may fail during rebuilding the data stored in the two failed storages. Thus, RAID 6 may have a scheme tackling with the likelihood of the hot spare failure.

SUMMARY

The disclosed storage control device includes a first rebuilding unit rebuilding information stored in one of said plurality of storages that fails by using information stored in said plurality of storages excluding said failed storage and storing rebuilt information in a spare storage replaced with the failed storage, a second rebuilding unit rebuilding information stored in two of said plurality of storages that fail by using information stored in said plurality of storages excluding the two failed storages and storing rebuilt information in two spare storages replaced with the two failed storages, and a rebuilding control unit controlling said first rebuilding unit and second rebuilding unit where one of said spare storages fails during rebuilding the data stored in said two failed storages to replace the failed spare storage with other spare storage whereby said second rebuilding unit continues rebuilding the data.

Additional objects and advantages of the embodiment will be set forth in part in the description which follows, and in part will be obvious from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 illustrates a configuration table;

FIG. 4 illustrates a rebuilding control table;

DETAILED DESCRIPTION OF THE PREFERRED EMBODIMENTS

Figure 1:
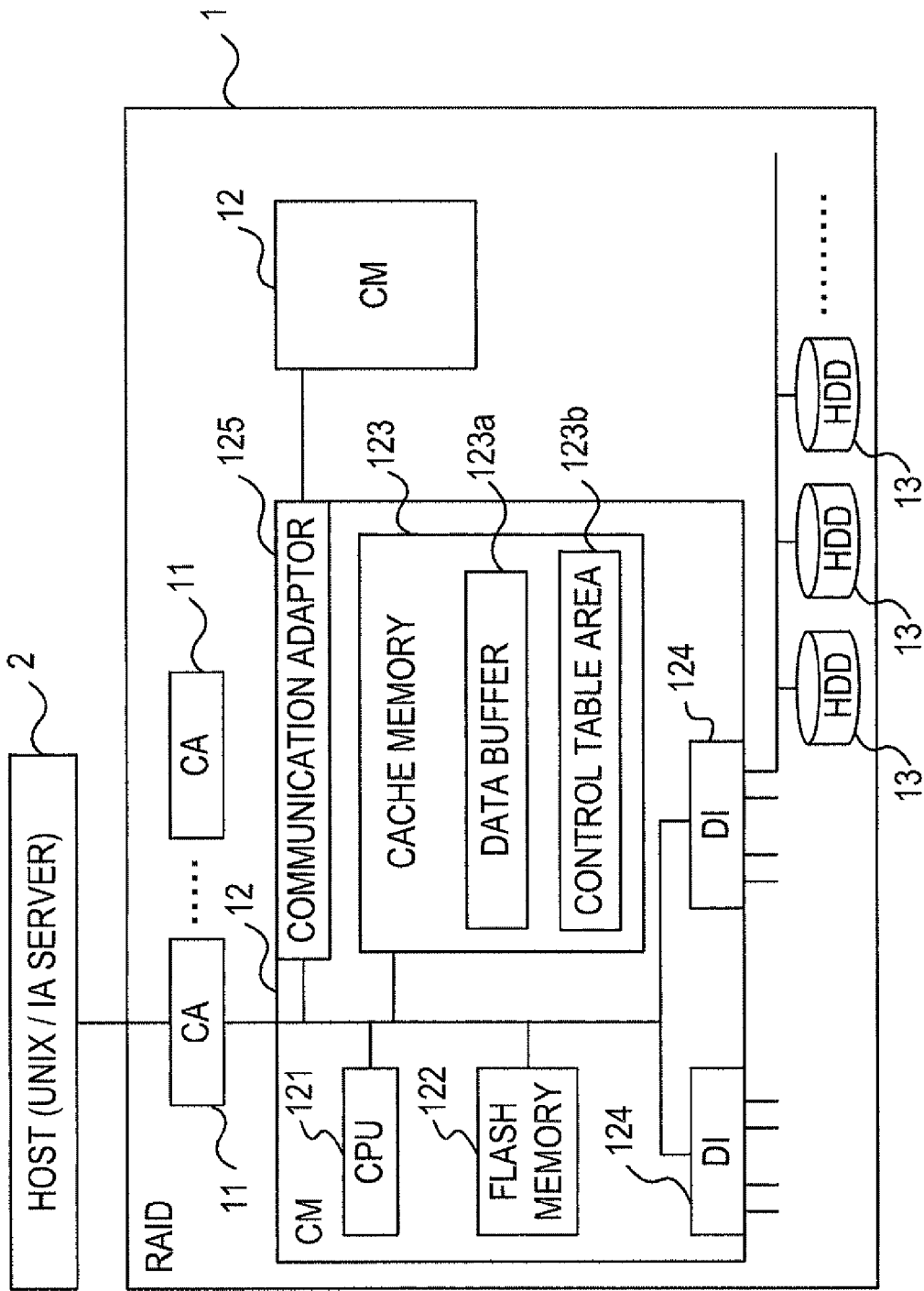
FIG. 1 illustrates a structure of a RAID device employing a storage control device according to an embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a structure of a RAID device employing a storage device according to an embodiment. A RAID device 1 connects with a host computer 2 (hereinafter referred to as the "host") such as a UNIX (registered trademark) server or an Intel Architecture (IA) server. The RAID device 1 duplicates data transmitted from the host 2 and then stores the data. For that purpose, the RAID device has a plurality of channel adapters (CA) 11, two controller modules (CM) and numerous hard disks (HDD) 13.

The CMs 12 access the HDDs 13 in accordance with command(s) issued by the host 2, where as illustrated in FIG. 1, a CM has a CPU 121, a flash memory 122, a cache memory 123, two disk interface adaptors (DI) 124 and a communication adaptor 125 for communication with another CM 12. The flash memory 122 stores a program implemented by the CPU 121. The CPU 121 caches the program in cache memory 123 to control the storages. The storage control device according to an embodiment is implemented by the CMs 12.

The program may be distributed with other flash memory, an optical disk or a portable HDD, etc. Alternatively, the program may be distributed through a communication network. Further, storages to be rebuilt may not necessarily be homogeneous. Different types of storages may be used.

Figure 2:
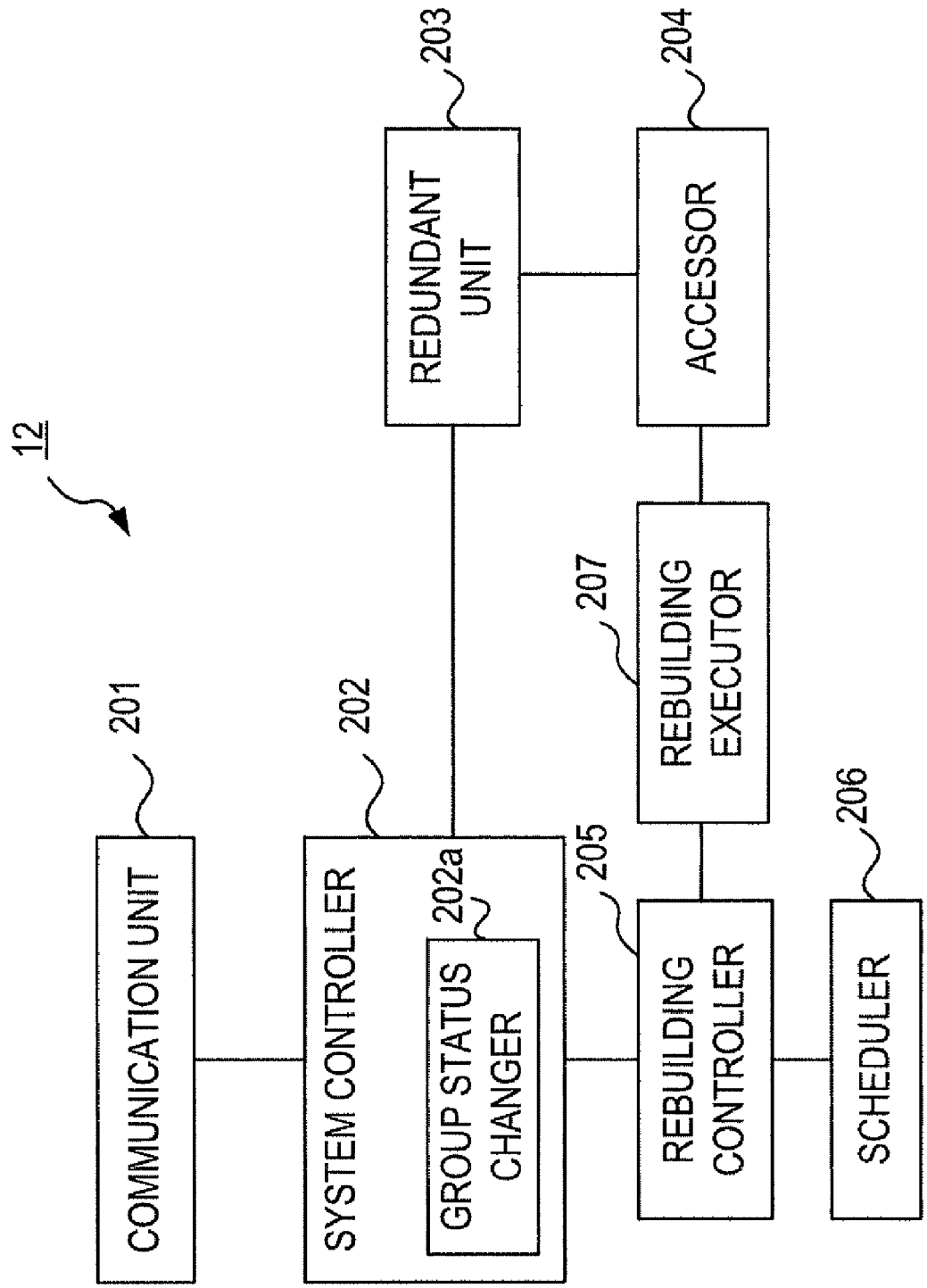
FIG. 2 illustrates a structure of a controller module (CM) included in a RAID device employing a storage control device according to an embodiment.

FIG. 2 illustrates a structure of the CM 12.

The CM 12 has a communication unit 201, a system controller 202, a redundant unit 203, an accessor 204, a rebuilding controller 205, a scheduler 206 and a rebuilding executor 207.

The communication unit 201 is used for communications with the host 2 or another CM 12. The system controller 202 controls all CMs 12. The HDDs 13 in which information such as data and parities are distributed are treated as one group. When the HDD 13 included in a group, in other words, the RAID group, fails, members of the RAID group change with the failure. The group is managed and changed by a group status changer 202a provided in system controller 202.

The redundant unit 203 generates parities from data transmitted from the system controller 202; and distributes the generated parities and the data across the HDDs 13 included in the RAID group. The HDDs 13 are accessed through the accessor 204, thereby data is stored into or read from the HDDs 13 through the accessor 204.

The rebuilding executor 207 rebuilds information stored in a failed one of the HDDs 13 from information stored in the rest of the HDDs 13 included in the same RAID group; and then the rebuilt data is stored in a HS that is replaced with the failed HDD 13. The data is read, rebuilt and stored by stripe through the accessor 204.

The rebuilt controller 205 controls a rebuilding processing of the data stored in the failed HDD 13, in other words, operation(s) of the rebuilding executor 207. The scheduler 206 schedules the rebuilding processing of the data stored in the failed HDD 13.

The CPU 121 implements the components 201 through 207 with the program stored in the flash memory 122, thereby processing requests issued from the host 2, rebuilding the data stored in the failed HDD 13 automatically. The CPU 121 may also be part of hardware components 201-207 implementing operation(s) of rebuilding data.

The cache memory 123 shown in FIG. 1 has a data buffer 123a for duplication of data. A control table area 123b included in the memory 123 stores tables shown in FIGS. 3 and 4. Rebuilding processing of data stored in storages in RAID 6 according to an embodiment will be disclosed in reference with FIGS. 3 through 6.

Figure 5:
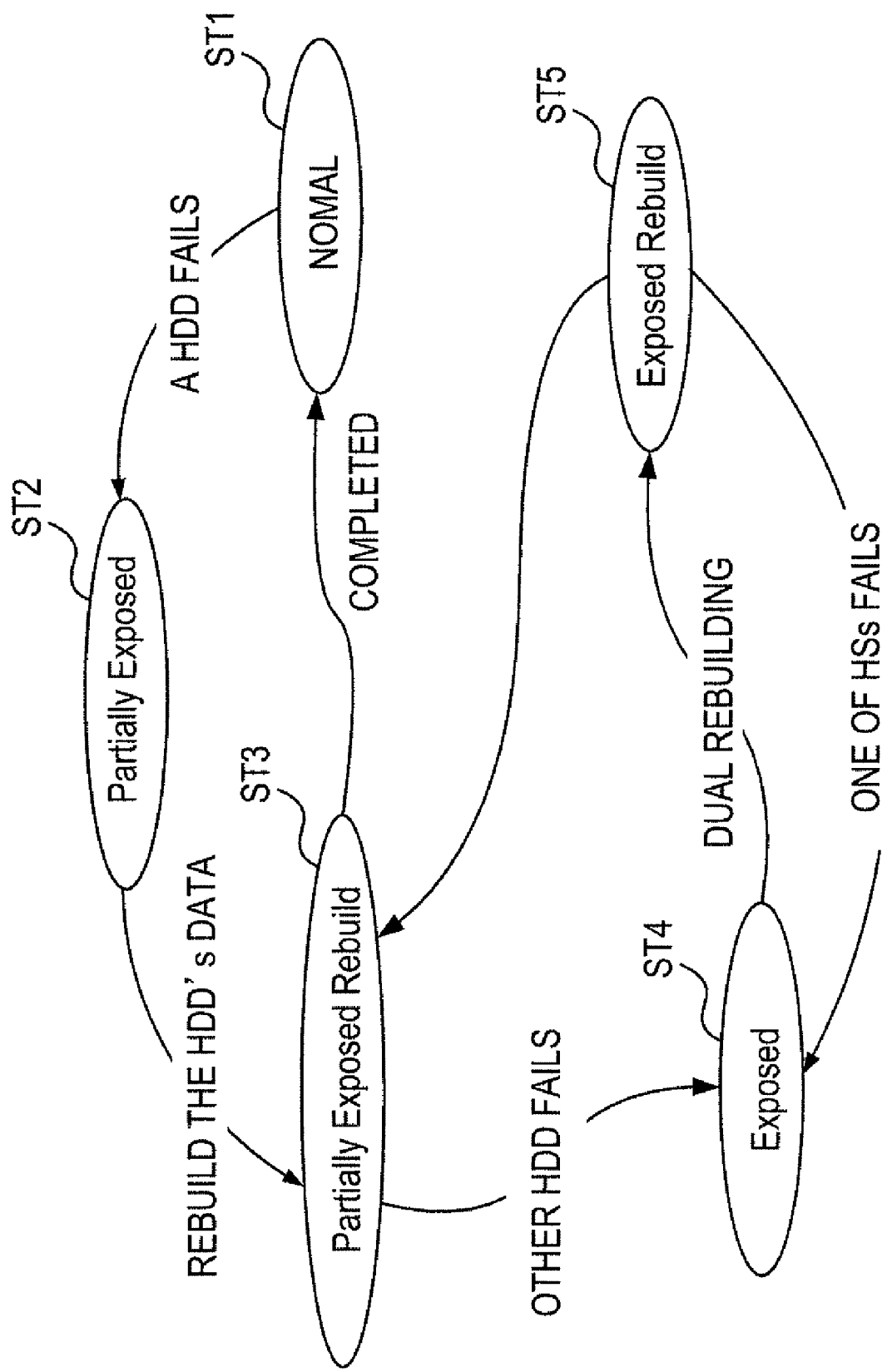
FIG. 5 illustrates a status transition diagram of a RAID group in RAID 6.

FIG. 5 is a status transition diagram of a RAID group in RAID 6, illustrating statuses of a RAID group from an occurrence of a failure of a HDD 13 to a completion of the rebuilding processing.

As shown in FIG. 5, the status of the RAID group transits from a normal status ST1 to a Partially Exposed status ST2 in which one HDD 13 fails after a first HDD 13 fails. Then the status transits to Partially Exposed Rebuild status ST3 in which the data stored in the HDD 13 are rebuilt. After rebuilding the data, the status transits to the normal status ST1. If a second HDD 13 fails during rebuilding the data stored in first failed HDD 13, the status transits to Exposed status ST4 in which the two HDDs 13 fail. Then the status transits to Exposed Rebuild status ST5 in which data stored in the two failed HDDs 13 are rebuilt.

If one of the HSs in which rebuilt data is stored fails during rebuilding the data stored in the two failed HDDs 13, in other words, three disks fails, the status returns to the Exposed status ST4. In ST4, the failed HS is replaced with other HS, then the data stored in the two failed HDDs 13 are rebuilt in the Exposed Rebuild status ST5. In an embodiment, when one of the HSs fails, the status of the RAID group once backs to ST4 from ST5 to deal with the failure of the HS. When the data stored in one of the failed HDDs 13 are rebuilt, the status transits to the Partially Exposed Rebuild status ST3 in which one HDD 13 fails.

Figure 6A:
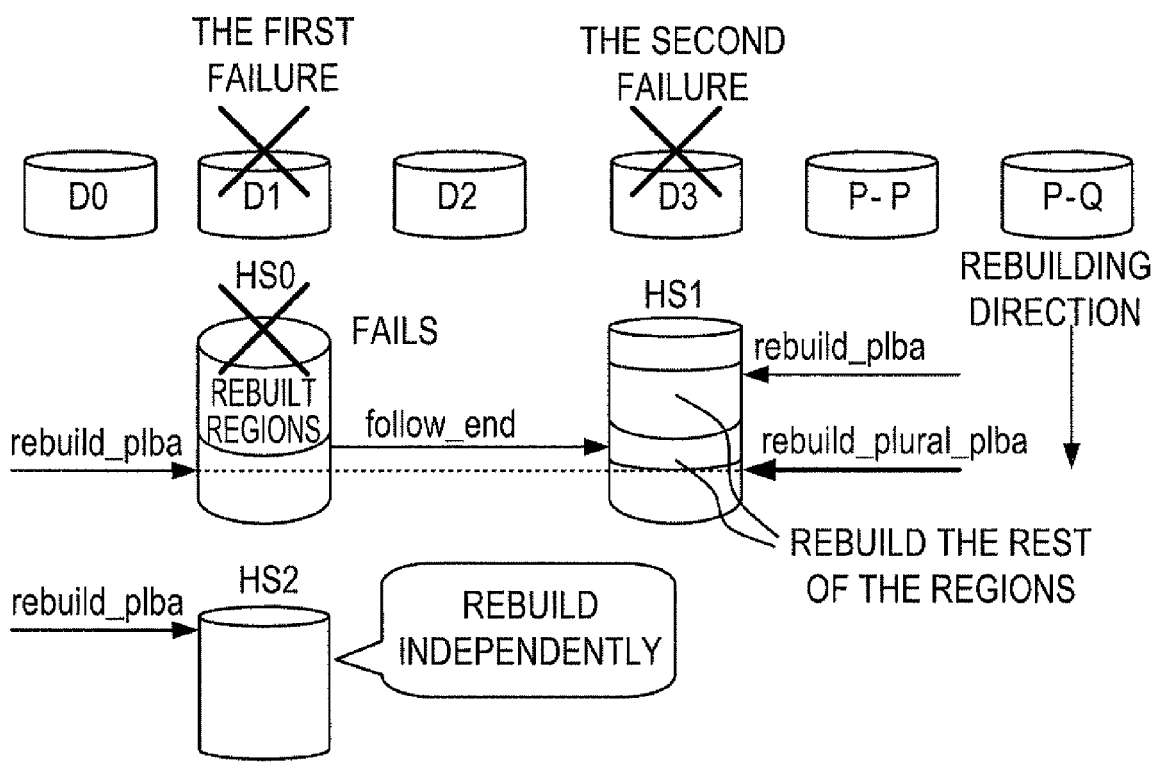
FIGS. 6A and 6B illustrate a reconstruction process where one of HSs fails during rebuilding data stored in two HDDs.
Figure 6B:
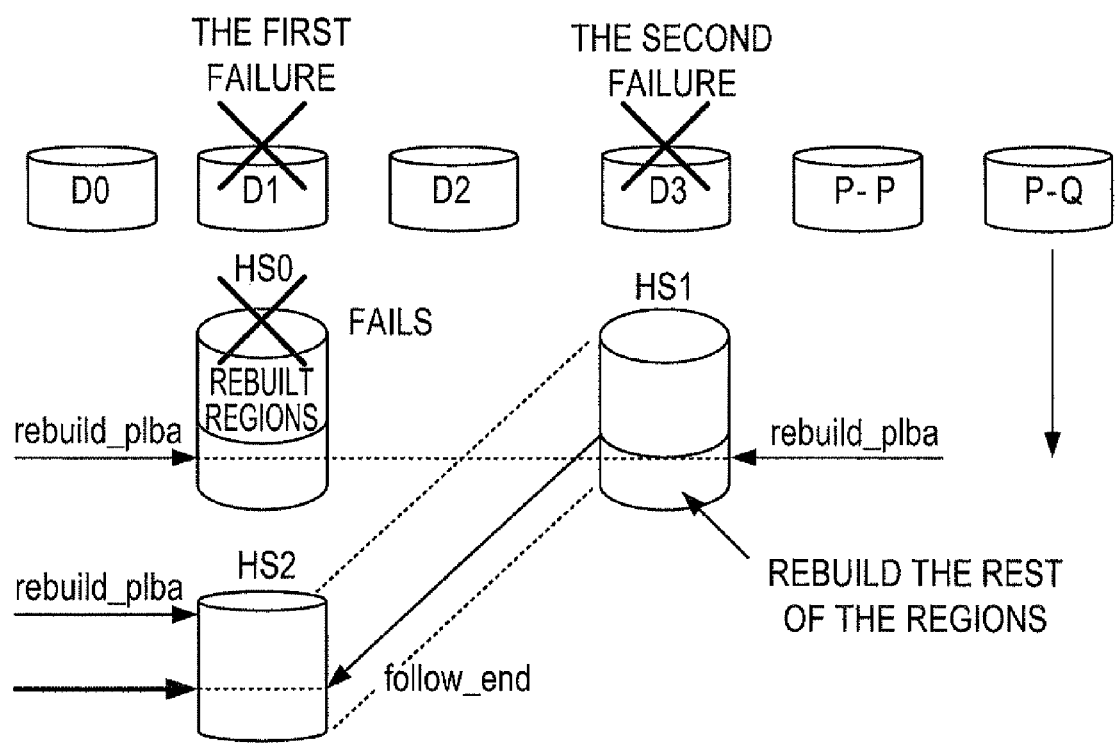

FIGS. 6A and 6B illustrate a rebuilding processing when one of the HSs fails during rebuilding two failed HDDs 13. FIG. 6A illustrates a rebuilding processing where regions having been rebuilt in an intact HS are nonadjacent. FIG. 6B illustrates the rebuilding processing where regions having been rebuilt in the intact HS are adjacent.

In FIGS. 6A and 6B, D0 through D3 refer information stored, and P-P and P-Q refer two kinds of parities to be stored as information. As shown in FIGS. 6A and 6B, the RAID group includes six HDDs 13: four for data storage and two for parity storage. HS0 through HS2 refer to the HSs replaced with failed HDDs 13 and failed HS. Hereinafter, D0 through D3, P-P, P-Q and HS0 through HS2 refer to a HDD 13 respectively. Alternatively, the HDDs 13 are referred to as disks.

Firstly, rebuilding processing for a case in which two HDDs 13 fail is disclosed. Ordinary, the case refers to a situation where a second failure of the HDD 13 occurs during rebuilding a first failure of the failed HDD 13. Secondly, rebuilding processing for a case in which one of the HSs fails, in other words, a third failure occurs, is disclosed.

Data stored in the first failed HDD 13 have been rebuilt and copied to the HS that is replaced with the first failed HDD 13 to a certain point until the second HDD 13 fails. Thus, an entirety of the regions having been rebuilt are copied to newly replaced HS and regions not having been rebuilt will be rebuilt and copied to two HSs. As described above, data rebuilding is executed in two different ways depending on whether the data is rebuilt in two HSs concurrently. In FIG. 6A, in a case where a disk D3 fails when data stored in the first failed HDD 13, a disk D1, are rebuilt and copied to a disk HS0 to a point where "follow_end" indicates. As shown in FIG. 6A, the regions to the point indicated with "follow_end" are rebuilt and copied to one HS and after the disk HS0 fails, the regions from the point indicated with "follow_end" are rebuilt and copied to the disks HS0 and HS1 concurrently.

Where one or more HSs fail during rebuilding data stored in two HDDs as described above, rebuilding processing differs depending on whether regions having been rebuilt and copied to the intact HS are adjacent as shown in FIG. 6B or nonadjacent as shown in FIG. 6A. The former case is defined as "adjacent regions" and the latter is defined as "nonadjacent regions".

The regions having been rebuilt and copied to the intact HS are nonadjacent at the point when one or more HS fail, regions not having been rebuilt and copied to the intact HS will be rebuilt and copied continuously to the intact HS, in this case, the disk HS1; and the data stored in the failed HS, the disk HS0, will be rebuilt and copied to the disk HS2 that is replaced with the failed HS from scratch in this embodiment. That is to say, data is rebuilt and copied to the disks HS1 and HS2 independently as shown in FIG. 6A.

Whereas, the regions having been rebuilt are adjacent at the point when one or more HSs fail, regions not having been rebuilt will be rebuilt and copied continuously to the intact HS in parallel with rebuilding and copying to the newly used HS. Regions not having been rebuilt will be rebuilt and copied to the new HS will be rebuilt and copied to the new HS independently. Briefly, data are rebuilt and copied to the new HS in two concurrent rebuilding processing.

As described above, even if one or more HSs fail, regions to be subject to data rebuilding and copying to the intact HS is the regions not having been rebuilt and copied to the intact HS regardless of whether the regions having been rebuilt and copied to the intact HS are adjacent or nonadjacent. Therefore, the redundancy is restored within a short period of time.

Whereas, the regions having been rebuilt and copied to the intact HS are nonadjacent, data rebuilding and copying to the new HS are executed independently to facilitate controlling rebuilding processing and reduce seek time in rebuilding. Reducing seek time reduced is one of the factors to reduce rebuilding time.

For the rebuilding processing described above, a table for management (herein after referred to as a configuration table is provided for each HDD 13 in an embodiment. Further, a table for rebuilding (hereinafter referred to as a rebuilding control table) is provided for a failed HDD 13. The control table area 123b included in the cache memory 123 shown in FIG. 1 stores the configuration tables and the rebuilding control tables. The descriptions of the tables will be made with reference to FIGS. 3 and 4.

FIG. 3 illustrates a structure of a configuration table. The configuration table is provided for each HDD 13 included in the RAID device 1, storing a variety of parameters. Parameters not used for rebuilding are referred to as "reserve". Parameters excluding "reserve" are disclosed below. Alphanumeric characters such as "0x00" or "0x04" described outside of the table denote values of relative addresses.

"Status" is a parameter indicating a status of a HDD 13. With the parameters, the RAID device judges that the HDDs 13 are in one of a normal status, a failure status or a rebuilding status. "PLUN" is a parameter indicating an identification number assigned to the HDD 13, i.e., a disk number. "RLUN" is a parameter indicating an identification number assigned to an RAID group in which the HDD 13 is included, i.e., a group number.

"Block Count" is a parameter indicating a capacity of a HDD 13. For the HDDs 13, each sector is assigned a serial number with which a sector is specified in a form of Logical Block Addressing (LBA). The parameters indicate capacities in LBA form. A value of the parameter is obtained by adding 1 to the sector number assigned to the last sector. Hereinafter, descriptions are made in the premise of employing LBA.

"rebuild_plba" is a parameter indicating an end point of a region having been rebuilt. The end point is indicated with a sector number. "Rebuild Block Count" is a parameter indicating an amount of data processing at one time, namely, a size of one stripe. The size is indicated with the number of sectors. A stripe is tantamount to a block.

"rebuild_pair_plun" is a parameter indicating a disk number of a HS to which data are rebuilt and copied in parallel with the previously used HS. An initial value of the parameter is "0xffff". In rebuilding and copying data to the two HSs concurrently, a previously used HS is defined as a master HS and a HS used next is defined as a slave HS. Parameter "rebuild_pair_plun" is set to the master HS only. "rebuild_mode" is a parameter indicating whether data are rebuild and copied to two HSs concurrently. The initial value of the parameter is "0", and where data are rebuilt and copied to two HSs concurrently, the value changes to "1". Parameter "rebuild_mode" is also set to the master HS only.

"rebuild_follow_end_plba" is a parameter indicating a start point of concurrent data rebuilding and copying to two HSs. This parameter is set to the slave HS only. An initial value of the parameter is "0xffffffff". "rebuild_plural_plba" is a parameter indicating an end point of data rebuilding in the slave HS. The parameter is set to the slave HS only. An initial value of the parameter is "0xffffffff".

Of the parameters described above, "rebuild_pair_plun", "rebuild_mode", "rebuild_follow_end_plba" and "rebuild_plural_plba" are used for concurrent data rebuilding and copying to two HSs. In this reason, these parameters are defined as "dual rebuilding parameters".

The parameters such as "rebuild_plba", "rebuild_plural_plba" and "follow_end" shown in FIGS. 6A and 6B are the names or the abbreviations of the parameters shown in FIG. 3, indicating rebuilding progresses in the disk HS0 and the disk HS2.

FIG. 4 illustrates a structure of a rebuilding control table. The rebuilding control table is provided for each HDD 13 to be rebuilt. In rebuilding a HDD 13, this table is referred. Likewise FIG. 3, parameters not indicating as "reserve" are described.

The alphanumeric characters such as "0x00" or "0x04" described outside of the table refer values of relative addresses as well as FIG. 3.

"RLUN" is a group number assigned to a RAID group in which a HS replaced with a failed HDD 13 is included. "destination PLUN" is a disk number of the HS replaced with the failed HDD 13. "source PLUN" is a disk number of the failed HDD13 or a failed HS.

"previous_acb_address" is a parameter indicating a first address at which a previous rebuilding control table is stored. "next_acb_address" is a parameter indicating a first address at which subsequent rebuilding control table is stored. The rebuilding control tables are referred in accordance with the parameters. Where the previous or the subsequent table does not exist, the parameter is referred to as "NULL".

"rebuild_start_lba" is a parameter indicating a number of a first sector of a block to be rebuilt next. "plural_rebuild_exe" is a parameter indicating rebuilding modes: a single rebuilding mode in which data are rebuilt and copied to a single disk; a dual rebuilding mode in which data are rebuilt and copied to dual disks concurrently. In the single rebuilding mode, the value of the parameter is "0", while in the dual rebuilding mode, the value is "1".

In an embodiment, stripes to be rebuilt are rebuilt to in the order of the master HS to the slave HS. Where all stripes to be rebuilt are rebuilt in the master HS and the slave HS, the mode enters into a sleep mode in which data rebuilding is not executed. "rebuilt_sleep" is a parameter indicating the sleep mode. Where the mode is not in the sleep mode, a value of the parameter is "0". Where the mode enters into the sleep mode, a value of the parameter is "1". "awaken_need" is a parameter indicating a necessity of sleep mode set to the slave HS release on releasing the dual rebuilding mode. A value of the parameter is "0" when the sleep mode is set. When the sleep mode is released, the value is set to "1".

Where data stored in two HDDs are rebuilt by using the disks HS0 and HS1, the data is rebuilt in the disk HS1 in the single rebuilding mode excluding regions to be rebuilt after the second failure occurs. Therefore, the data is rebuilt in the disk HS1 in the single rebuilding mode and the dual rebuilding mode. Thus, two rebuilding control tables are provided.

Operations of a CM 12 in an event of a failure are disclosed with reference to FIGS. 7 through 12. The CPU 121 manages the operations and tables shown in FIGS. 3 and 4 by implementing the program stored in the flash memory 122.

Figure 7:
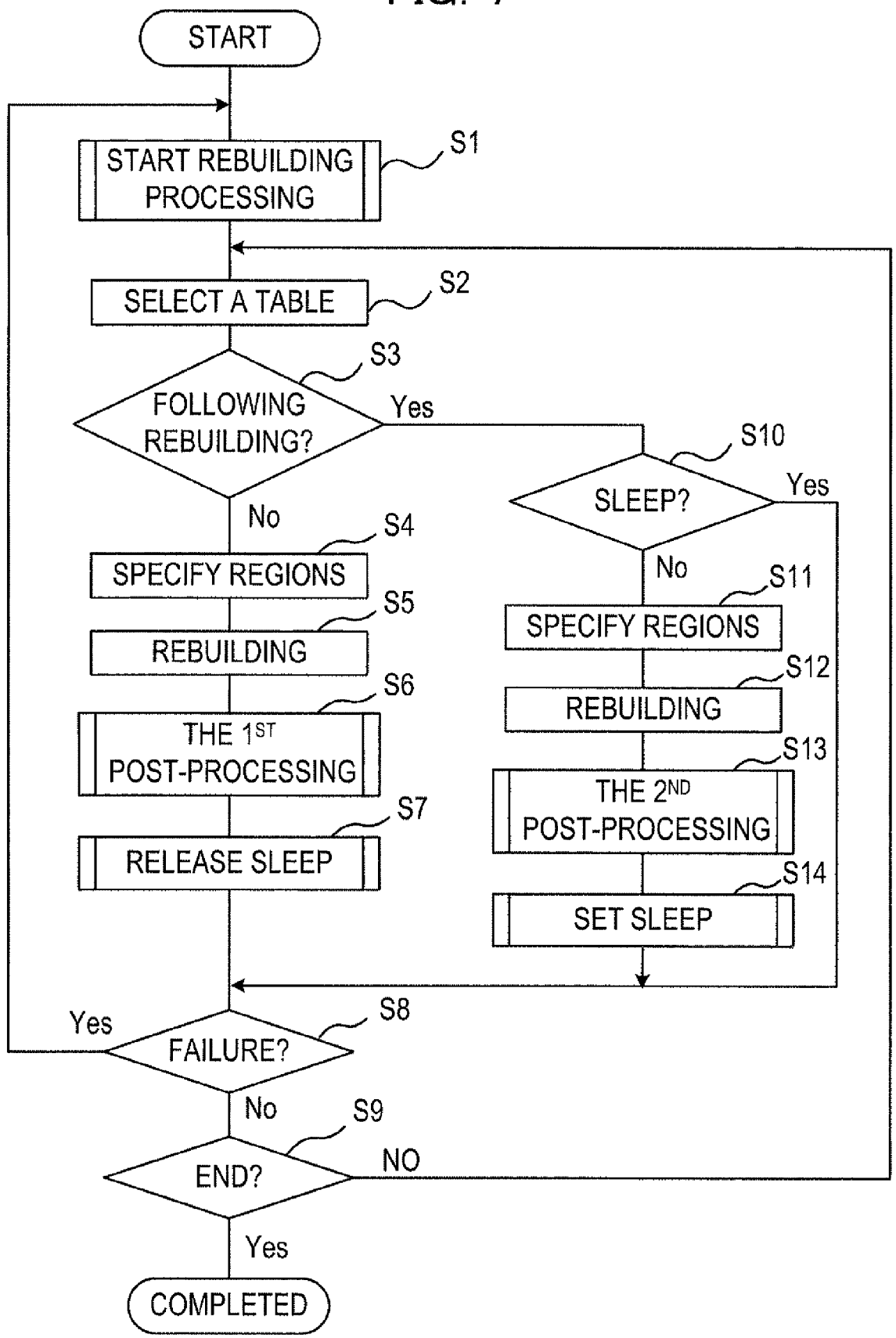
FIG. 7 illustrates a flow chart of rebuilding processing.

FIG. 7 illustrates a flow chart of a rebuilding processing started from a failure among HDD 13 and end with a completion of the rebuilding. The rebuilding processing of the data stored in the HDD13 are disclosed with reference to the FIG. 7.

In operation S1, the rebuilding processing is initiated from a start processing in response to a failure. In the start processing, a configuration table for a failed HDD 13 is initialized and a rebuilding control table is created or deleted.

In operation S2, select a rebuilding control table. In operation S3, the rebuilding process judges whether the selection of the rebuilding control table is for a slave HS by determining whether the selection is following a rebuilding. When a value of plural_rebuild_exe stored in the rebuilding control table is "1", indicating the dual rebuilding mode, and a value of rebuild_mode stored in a configuration table specified with a destination PLUN is the initial value "0", the selected rebuilding control table is for the slave HS. Therefore, a judgment is YES, and the operation moves onto operation S10. If the selected rebuilding control table is for the master HS, or the value of "plural_rebuild_exe" indicates the single rebuilding mode, a judgment is NO, and the operation moves onto operation S4.

In operation S4, regions to be rebuilt are configured. A first sector of the regions is specified with rebuild_start_lba stored in the selected rebuilding control table and the extent of the regions is specified with Rebuild Block Count stored in the configuration table, which indicates the number of the sectors. Then the regions are rebuilt in operation S5 as configured in operation S4. The detailed description of the rebuilding is omitted because the rebuilding is done with a known technique. Then the operation moves onto operation S6.

In operation S6, a first post-processing for a next rebuilding is executed. In operation S7, a sleep mode set to the slave HS is released as necessary. In operation S8, judge whether another failure occurs. If another failure occurs, a judgment is YES and the operation returns to operation S1. If another failure does not occur, a judgment is NO and the operation moves onto operation S9. The CPU 121 judges whether another failure occurs by monitoring accesses to the HDDs 13 via the DIs 124.

In operation S9, judge whether all data are rebuilt. When a HDD13 is rebuilt, a rebuilding control table for the HDD is deleted in an embodiment. When no rebuilding control table exists, a judgment is YES, and the rebuilding processing is completed. When all data are not rebuilt, a judgment is NO, and the operation returns to operation S2 and selects a control table.

Where a judgment in operation S3 is YES, the operation moves to operation S10. In operation S10, the processing judges whether a value of rebuild_sleep stored in the selected rebuilding control table indicates the sleep mode. Whether the value of the rebuild_sleep is "1", indicating the sleep mode, a judgment is YES and the operation moves onto operation S8. When the value is "0", a judgment is NO, and the operation moves onto operation S11.

As well as operation S4, regions to be rebuilt are configured in operation S11. In operation S12, the regions configured are rebuilt. Then a second post-processing for a next rebuilding is executed in operation S13. In operation S14, the sleep mode is set as necessary. Then the operation moves onto operation S8.

Next, sub routine processes executed in the rebuilding processing described above are disclosed.

Figure 8:
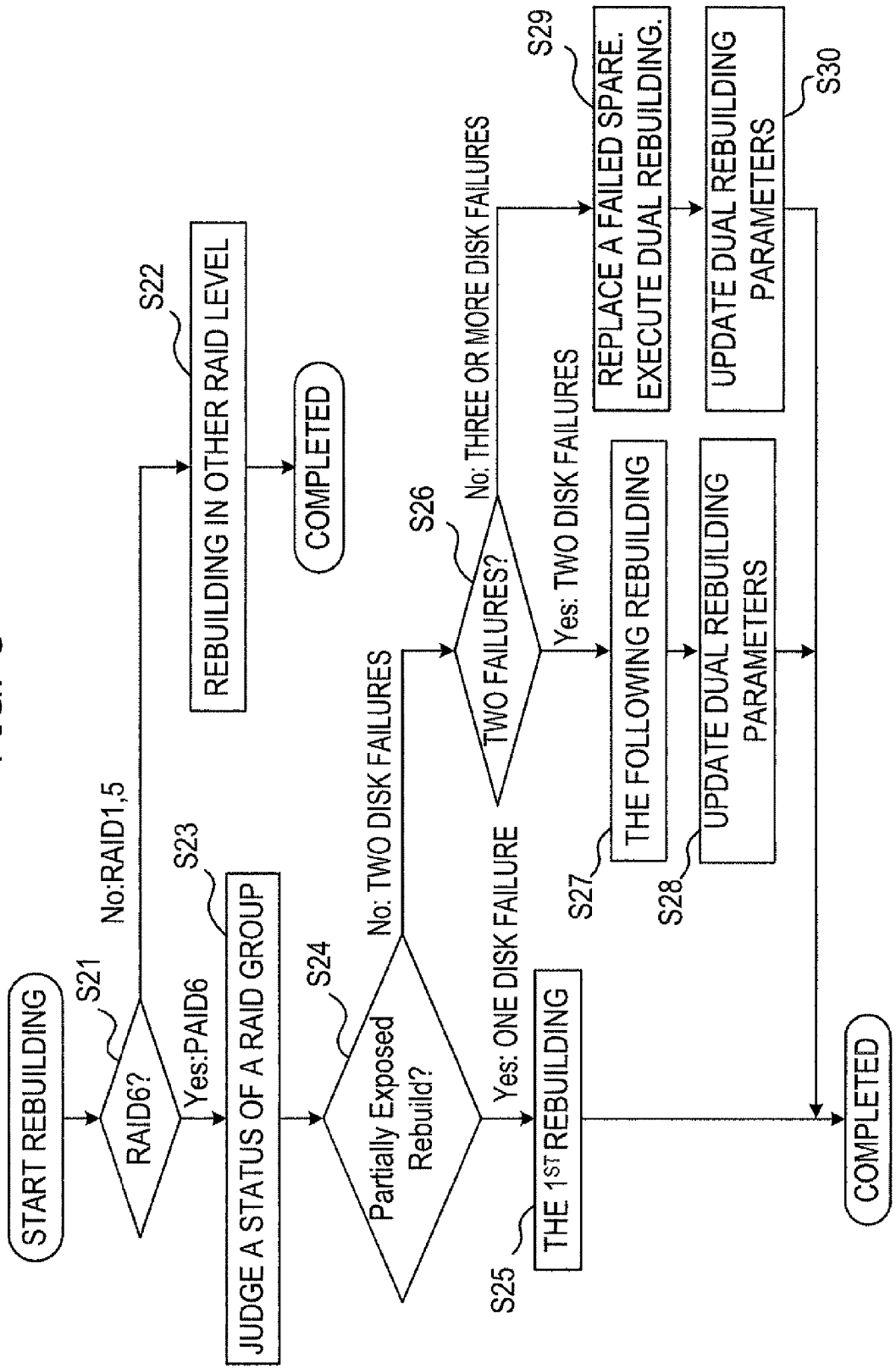
FIG. 8 illustrates a flow chart of a start processing.

FIG. 8 is a flow chart of the start processing executed in operation S1 shown in FIG. 7. The start processing is disclosed with reference to FIG. 8.

In operation S21, the processing judges whether the failed HDD13 is in RAID 6. The RAID level of the failed HDD 13 is managed with a management table for the RAID group. If the RAID level of the HDD is RAID 6 stored in the management table for the RAID group, a judgment is YES and the operation moves onto operation S23. Where the RAID level of the HDD is other than RAID 6, for example RAID 1 or RAID 5, a judgment is NO and the operation moves to operation S22. Then rebuilding processing according to the RAID level is executed. Then, the start processing is completed.

In operation S23, the RAID device judges a status of the RAID group in which another failure occurs.

In operation S24, when the RAID group is in a status of Partially Exposed Rebuild status ST3 in which one failed HDD 13 included in the RAID group is being rebuilt, a judgment is YES and the operation moves to operation S25. Then the start processing is completed after preparing the first rebuilding processing at operation 25.

In this preparation, a rebuilding control table in which a value of plural_rebuild_exe is defaulted to "0" is created. The destination PLUN is configured to a disk number of the HS replaced with a failed HDD 13. The source PLUN is configured to a disk number of the failed HDD 13. "Status" and "PLUN" stored in a configuration table for the HS replaced with the failed HDD 13 is updated to values indicating the rebuilding status and a number of a RAID group in which the failed HDD is included, respectively. "Status" stored in the configuration table for the failed HDD 13 is updated to a value indicating a failure status.

In RAID 6 is not capable of handling a situation in which three HDDs 13 in the same RAID group fail concurrently. Although not shown in FIG. 7, the RAID device judges the status of the RAID group in which another failure occurs in operation S23. When the number of the failed disks is beyond the limit, rebuilding processing will be terminated.

In operation S26, the RAID device judges whether there are two failed HDDs 13 in the RAID group. As shown in FIGS. 6A and 6B, where the disk D3 fails during rebuilding data stored in the disk D1, a judgment is YES, and the operation moves onto operation S27. Where one of HSs fails during rebuilding data using two HSs as shown in FIGS. 6A and 6B, a total of three failed disks occurs, and judgment at operation S26 a judgment is NO, and the operation moves onto operation S29.

In operation S27, a rebuilding control table is created as well as in operation S25. A value of plural_rebuild_exe stored in the rebuilding control table is "1"; and a value of plural_rebuild_exe stored in an existing rebuilding control table is updated to "1". Values of Status and RLUN stored in the configuration table are updated. Thereafter, the operation moves onto operation S28, and dual rebuilding parameters stored in the configuration tables for the master HS and the slave HS are updated. Then the starting processing is completed.

For the dual rebuilding parameters of the master HS, a value of "rebuild_pair_plun" is updated to a disk number of the master HS; and a value of "rebuild_mode" is updated to 1. For the dual rebuilding parameters of the slave HS, a value of "rebuild_pair_plun" is updated to a disk number of the master HS; and a value of "rebuild_follow_end_plba" is updated to a value of "rebuild_plba" of the master HS.

In operation S29, the rebuilding control table created for rebuilding in which the failed HS is used is deleted and then a new rebuilding control table for rebuilding is created and two configuration tables are updated (replace a failed spare).

In operation S30, the dual rebuilding parameters stored in the two configuration tables are updated as necessary. Then the start processing is completed.

In start processing, a rebuilding control table is created according to regions having been rebuilt in the intact HS. For instance, where the regions having been rebuilt are nonadjacent as shown in FIG. 6A, a rebuilding control table in which a single rebuilding mode is set is created; and the dual rebuilding mode set in the rebuilding control table for the intact HS is changed to the single rebuilding mode. Thus, data are rebuilt in the intact HS, in this case, the disk HS1, in the single rebuilding mode in twice, before and after the disk HS0 fails. For the configuration table for the intact HS, all parameters excluding rebuild_follow_end_plba are defaulted. For the new HS replaced with the failed HS, dual rebuilding parameters are not changed from their initial values. The reason why a value of rebuild_follow_end_plba is not defaulted is to avoid rebuilding regions having been rebuilt again.

Where the regions having been rebuilt are adjacent as shown in FIG. 6B, a rebuilding control table for the single rebuilding mode and the dual rebuilding mode are created respectively. The configuration table for the intact HS is not updated. For dual rebuilding parameters of the master HS, rebuild_mode is updated to 1 and other parameters are defaulted. For dual rebuilding parameters of the slave HS replaced with the failed HS, rebuild_pair_plun is updated to a disk number of the master HS and rebuild_follow_end_plba is updated to a value of rebuild_plba of the master HS.

In the start processing, rebuilding control tables are created or deleted and configuration tables are updated depending on situations in which another failure occurs as described above. Using these tables, rebuilding is executed.

Figure 9:
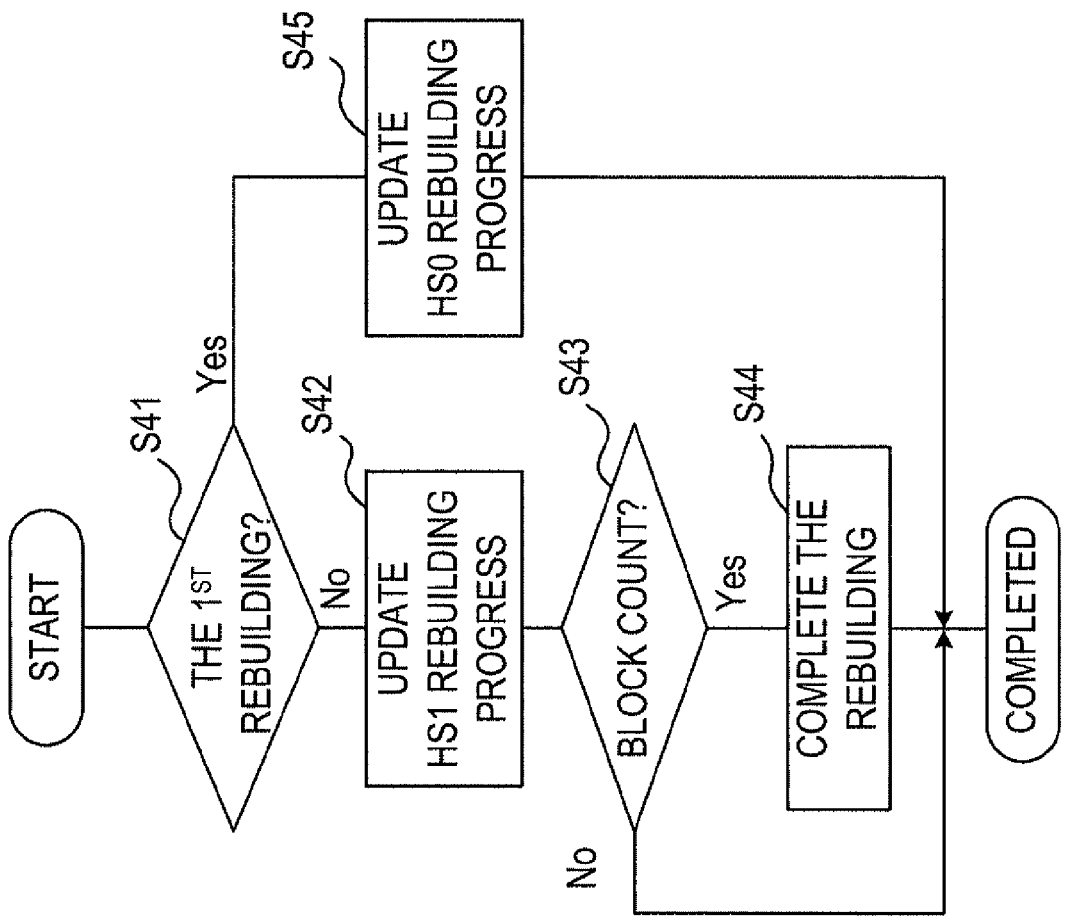
FIG. 9 illustrates a flow chart of a first post-processing.

FIG. 9 is a flow chart illustrating the first post-processing executed in operation S6 of rebuilding processing shown in FIG. 7. With reference to FIG. 9, the post-processing is disclosed.

The rebuilding processing is executed with reference to rebuilding control tables and configuration tables as previously mentioned. In the first post-processing, the rebuilding tables and the configuration tables reflect the rebuilding processing executed in the master HS once or executed in the single rebuilding mode once.

In operation S41, judge whether the previous data rebuilding is executed in the master HS by determining whether first rebuilding has occurred. Where the previous data rebuilding is executed in the master HS, a judgment is YES and the operation moves to operation S45. In operation S45, a rebuilding of the disk HS0 progress is updated, and rebuild_plba stored in a configuration table and/or rebuild_start_plba stored in a rebuilding control table are updated to a value indicating a sector number from which a next rebuilding is started. Thereafter, the first post-processing is completed. Whereas, the previous rebuilding is not executed in the master HS, a judgment is NO at operation S41. The rebuilding of the disk HS1 progress is updated in operation S42, then the operation moves to operation S43.

As shown in FIG. 6A, data is rebuilt in the disk HS1 in the single mode in twice, before the disk HS0 fails and after the disk HS0 fails. The rebuilding progress from the point indicated with rebuild_plural_plba is managed with rebuild_start_plba stored in a rebuilding control table. rebuild_plba is not updated because the parameter is used for other rebuilding in the single rebuilding mode.

In operation S43, judge whether the updated "rebuild_start_plba" indicates an end point by executing a block count. When the rebuilding in the configured mode is completed, a point where rebuild_start_plba indicates is identical to the end point. Therefore, a judgment is YES and the operation moves to operation S44. Then the rebuilding control table is deleted and the configuration table is defaulted and then the first post-processing is completed. Where the point indicated with rebuild_start_plba is not identical to the end point, a judgment is NO, and the first post-procession is completed.

In ordinary cases, the end point is indicated with Block Count as shown in FIG. 8. However, for the disk HS1 shown in FIG. 6A, the end point is the point where rebuild_plural_plba indicates. The end point indicated with Block Count or rebuild_plural_plba is determined based on a point where rebuild_start_plba indicates. Where the point indicated with rebuild_start_plba is anterior to the point indicated with rebuild_plural_plba, the end point is where rebuild_plural_plba specifies.

Figure 10:
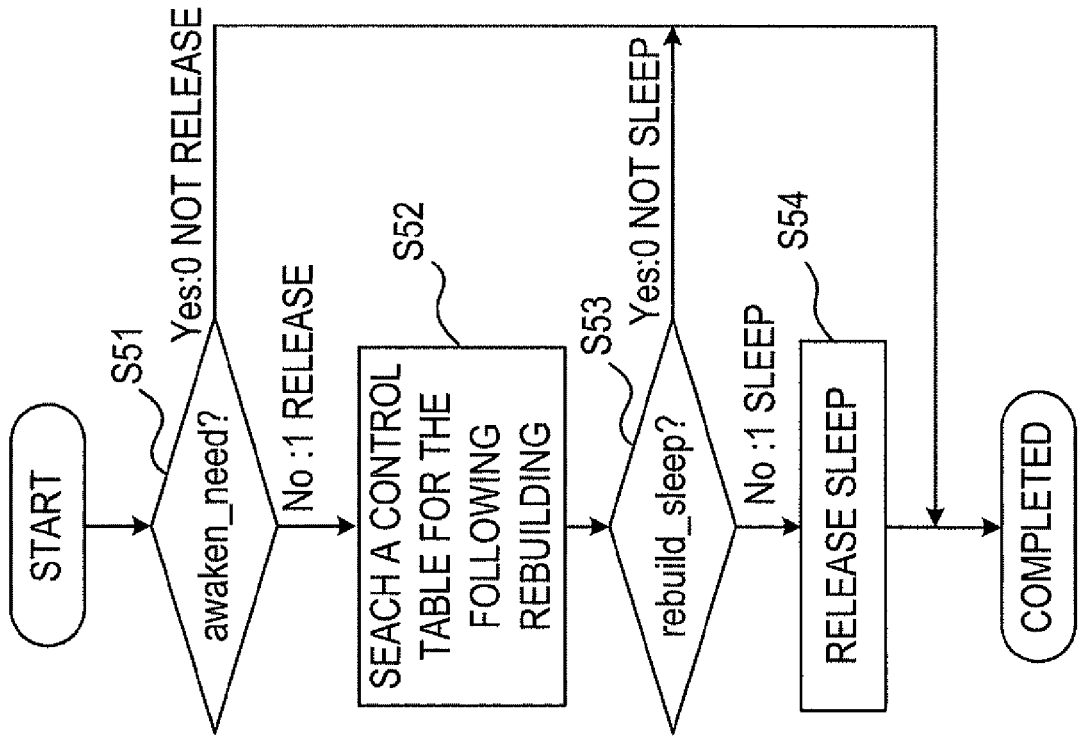
FIG. 10 illustrates a flow chart of a sleep release processing.

FIG. 10 is the flow chart illustrating the sleep release processing executed in operation S7 of the rebuilding processing shown in FIG. 7. With reference to FIG. 10 the detailed description of the sleep release processing is made. The sleep release processing is executed to release a sleep mode set to the slave HS.

In operation S51, judge whether a value of "awaken_need" stored in a rebuilding control table is "0". When the value of awaken_need is "0", the sleep mode set to the slave HS is not released, and therefore a judgment is YES, the sleep release processing is completed. When the value is not "0", a judgment is NO, and the operation moves to operation S52.

In operation S52, a rebuilding control table used for data rebuilding in the slave HS is searched and extracted. In operation S53, judge whether a value of rebuild_sleep stored in the rebuilding control table is "0", indicating that the slave HS is in sleep mode. When the slave HS is not in the sleep mode, a judgment is YES, and the sleep release processing is completed. When the slave HS is in the sleep mode, a judgment is NO, and the sleep mode is released by updating the value of "rebuild_sleep" to "0" in operation S54. Then the sleep release processing is completed.

Figure 11:
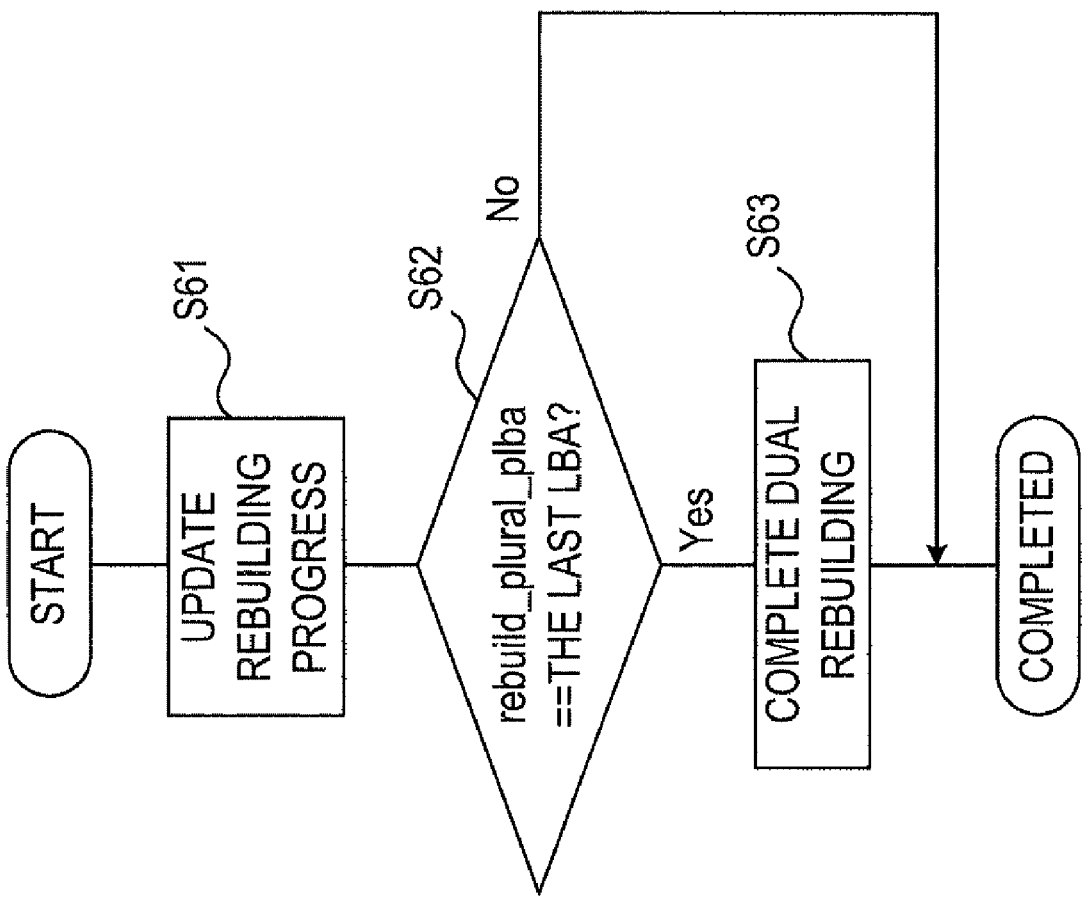
FIG. 11 illustrates a flow chart of a second post-processing.

FIG. 11 is the flow chart illustrating the second post-processing executed in operation S13 of the rebuilding processing shown in FIG. 7. With reference to FIG. 13, the detailed description of the second post-processing is made.

In operation S61, a progress of the rebuilding processing is checked; and a value of "rebuild_plural_plba" stored in a configuration table and a value of "rebuild_start_plba" stored in a rebuilding control table are updated to a value indicating a sector number from which a next rebuilding is started. Then the operation is move to operation S62.

In operation S62, judge whether the updated "rebuild_plural_plba" is the last LBA, in other words, indicates an end point of the rebuilding. Where the point specified with "rebuild_plural_plba" is identical to the point specified with Block Count, a judgment is YES and the operation is move to operation S63; and the rebuilding control tables used for data rebuilding in the first and slave HSs are deleted; the dual rebuilding parameters stored in each configuration table are defaulted; and then the second post-processing is completed. Where the point indicated with rebuild_plural_plba is not the end point, a judgment is No, and the second post-processing is completed.

Figure 12:
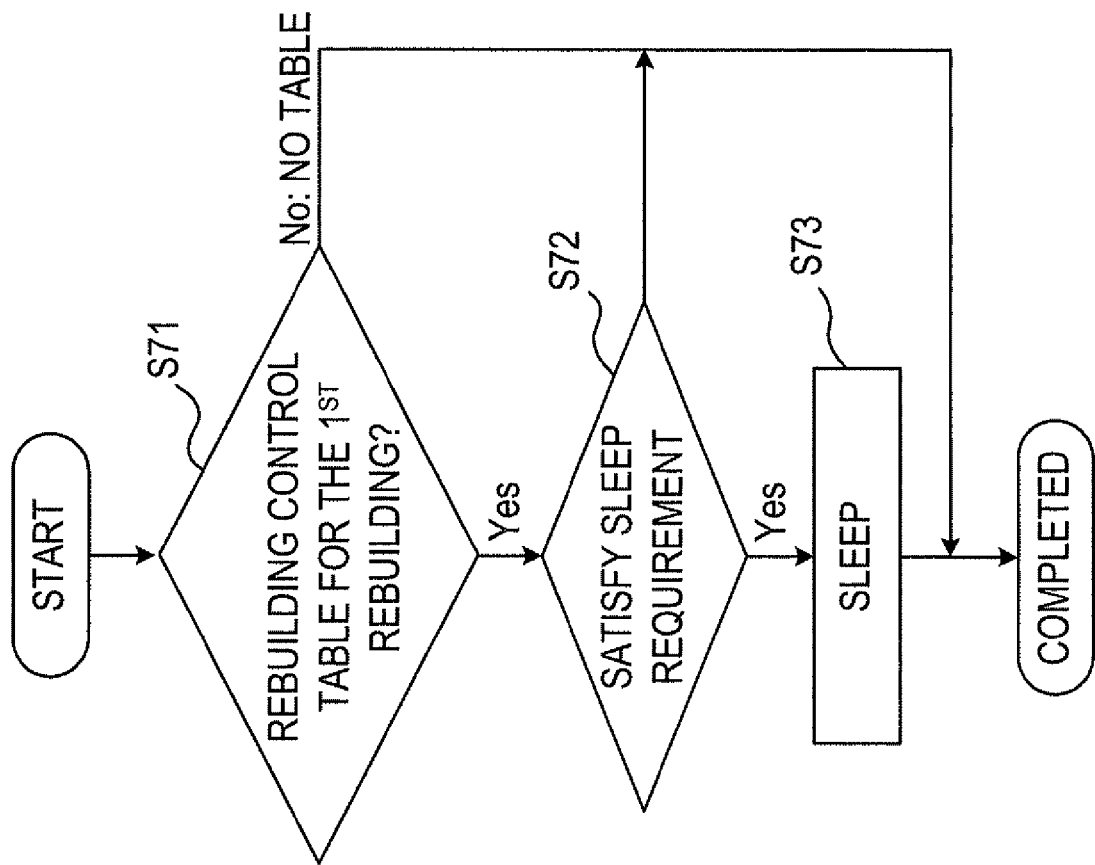
FIG. 12 illustrates a flow chart of sleep setting(s).

FIG. 12 is a flow chart illustrating the setting of sleep mode processing executed in operation S14 of the rebuilding processing shown in FIG. 7. With reference to FIG. 12, the detailed description of the setting of sleep mode processing is made. In an embodiment, the slave HS enters into the sleep mode when data rebuilding in the slave HS is completed to the same point where the data rebuilding in the master HS is completed.

In operation S71, judge whether a rebuilding control table used for data rebuilding in the master HS exists. When the rebuilding control table for the master HS exists, a judgment is YES and the operation is move to operation S72.

When the rebuilding control table for the master HS does not exist, a judgment is NO, and therefore the sleep mode is not set. Then the setting of sleep mode is completed.

In operation S72, judge whether the data rebuilding in the slave HS progresses to the same point where the data rebuilding in the master HS is completed. When the requirement is satisfied, a judgment is YES, and a value of "rebuild_sleep" stored in the rebuilding control table is updated to 1 to set the sleep mode in operation S73. Then the setting of sleep mode is completed. When the requirement is not satisfied, a judgment is NO, and the setting of sleep mode is completed.

Where one of the HSs fails during rebuilding data stored in two failed HDDs 13, the data are rebuilt in the different rebuilding modes depending on the conditions of data having been rebuilt in the intact HS in an embodiment. However, the data rebuilding may be executed in the same rebuilding mode. Alternatively, where the start points of the data rebuilding differ in one HS from the other, the data rebuilding may be executed in the different rebuilding modes in view of seek time. Further, where data are rebuilt in an HS twice, in the single rebuilding mode and the dual rebuilding mode, an execution order may be set to prioritize the dual rebuilding mode in which data are rebuilt in two HSs concurrently over the single rebuilding mode. Information such as the parameters used for data rebuilding are managed with the configuration tables and the rebuilding control tables. However, the management of the information is not limited to the way mentioned above.

Accordingly, a storage system such as the RAID device according to an embodiment: restores information stored in two of multiple storages, which fail, by using information stored in the rest of the storages, stores the rebuilt information in two spare storages replaced with the failed two storages, and where one of the spare storages fails during rebuilding data stored in the two failed storages, the failed spare storage is replaced with other spare storage. As such, data may be restored where two storages included in the same redundant group and one or more spare storage fail.

What is claimed is:

1. A storage control device for storing information across a plurality of storages, the storage control device comprising:
  a first rebuilding unit rebuilding information stored in one of said plurality of storages that fails by using information stored in said plurality of storages excluding said failed storage and storing rebuilt information in a spare storage replaced with the failed storage;
  a second rebuilding unit rebuilding information stored in two of said plurality of storages that fail by using information stored in said plurality of storages excluding the two failed storages and storing rebuilt information in two spare storages replaced with the two failed storages; and
  a rebuilding controller controlling said first rebuilding unit and second rebuilding unit, and
  where when one of said spare storages fails during a first rebuilding of the information stored in said two failed storages a second rebuilding is implemented by creating a rebuilding control table in which use of at least one of the two failed storages is deleted and replacing information of the rebuilding control table including using information of a configuration table.

2. The storage control device according to claim 1, wherein, where one of said spare storages fails, said rebuilding controller changes a type of a rebuilding processing of the information stored in said two failed storages executed by said second rebuilding unit depending on a rebuilding progress in an intact spare storage.

3. The storage control device according to claim 2, wherein said rebuilding controller changes the type of the rebuilding processing of the information stored in said two failed storages depending on whether regions having been rebuilt in said intact spare storage are adjacent.

4. The storage control device according to claim 3, wherein said rebuilding controller rebuilds the information stored in said two failed storages independently by said second rebuilding unit where the regions having been rebuilt in said intact spare storage are nonadjacent.

5. A storage control method for storing information across a plurality of storages, the storage control method comprising:
  executing a first rebuilding operation rebuilding information stored in one of said plurality of storages that fails by using information stored in said plurality of storages excluding said failed storage and storing rebuilt information in a spare storage replaced with said failed storage;
  executing a second rebuilding operation rebuilding information stored in two of said plurality of storages that fail by using information stored in said plurality of storages excluding said failed storages and storing rebuilt information in two spare storages replaced with said two failed storages; and
  controlling said first rebuilding operation and second rebuilding operation, and
  where when one of said spare storages fails during the first rebuilding operation of the information stored in said two failed storages the information is rebuilt continuously by implementing said second rebuilding operation by creating a rebuilding control table in which use of at least one of the two failed storages is deleted and replacing information of the rebuilding control table including using information of a configuration table.

6. The storage control method according to claim 5, wherein controlling changes the type of the rebuilding processing of the information stored in said two failed storages executed in said rebuilding operation depending on a rebuilding progress in said intact spare storage where one of said spare storages fails.

7. The storage control method according to claim 6, wherein controlling changes the type of the rebuilding processing of the information stored in said two failed storage depending on whether regions having been rebuilt in said intact spare storage are adjacent.

8. The storage control method according to claim 7, wherein controlling rebuilds the information stored in said two failed storages independently in said rebuilding operation where the regions having been rebuilt in said intact spare storage are nonadjacent.

9. A computer-readable recording medium for storing a storage control program for implementing storage control over a plurality of storages in which information is stored by a computer, wherein said program comprising:
  executing a first rebuilding processing for rebuilding information stored in one of said plurality of storages that fails by using information stored in said plurality of storages excluding said failed storage and storing rebuilt information in a spare storage replaced with said failed storage;
  executing a second rebuilding processing for rebuilding information stored in two of said plurality of storages that fail by using information stored in said plurality of storages excluding said two failed storages and storing rebuilt information in two spare storages replaced with said two failed storages; and controlling said first rebuilding processing and second rebuilding processing, and where when one of the spare storages fails during the first rebuilding processing of the information stored in said two failed storages said second rebuilding processing continue to rebuild the information by creating a rebuilding control table in which use of at least one of the two failed storages is deleted and replacing information of the rebuilding control table including using information of a configuration table.

10. The computer-readable recoding medium according to claim 9, wherein said controlling changes the type of the rebuilding processing of the information stored in said two failed storages executed by said second rebuilding unit depending on a rebuilding progress in an intact spare storage where one of said spare storages fails.

11. The computer-readable recording medium according to claim 10, wherein said controlling changes the type of the rebuilding processing of the information stored in said two failed storages depending on whether regions having been rebuilt in said intact spare storage are adjacent.

12. The computer-readable recording medium according to claim 11, wherein said controlling rebuilds the information stored in said two failed storages independently in said second rebuilding processing where regions having been rebuilt in said intact spare storage are nonadjacent.

\* \* \* \* \*

UNITED STATES PATENT AND TRADEMARK OFFICE
CERTIFICATE OF CORRECTION

PATENT NO. : 8,386,837 B2
APPLICATION NO. : 12/261853
DATED : February 26, 2013
INVENTOR(S) : Mikio Ito et al.

Page 1 of 1

It is certified that error appears in the above-identified patent and that said Letters Patent is hereby corrected as shown below:

On the title page, Column 1, Item (73) (Assignee), Line 1, Delete "Fujistu" and insert
-- Fujitsu --, therefor.

In the Claims

Column 13, Line 14 (Approx.), In Claim 10, Delete "recoding" and insert -- recording --, therefor.

Signed and Sealed this
Second Day of July, 2013

Teresa Stanek Rea
*Acting Director of the United States Patent and Trademark Office*